R. T. WAINWRIGHT.
SHOCK ABSORBER.
APPLICATION FILED AUG. 21, 1911.
1,032,454.
Patented July 16, 1912.
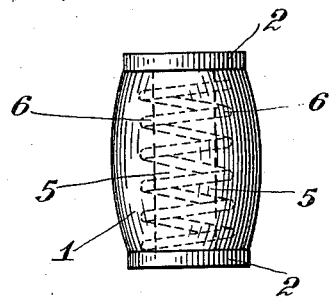
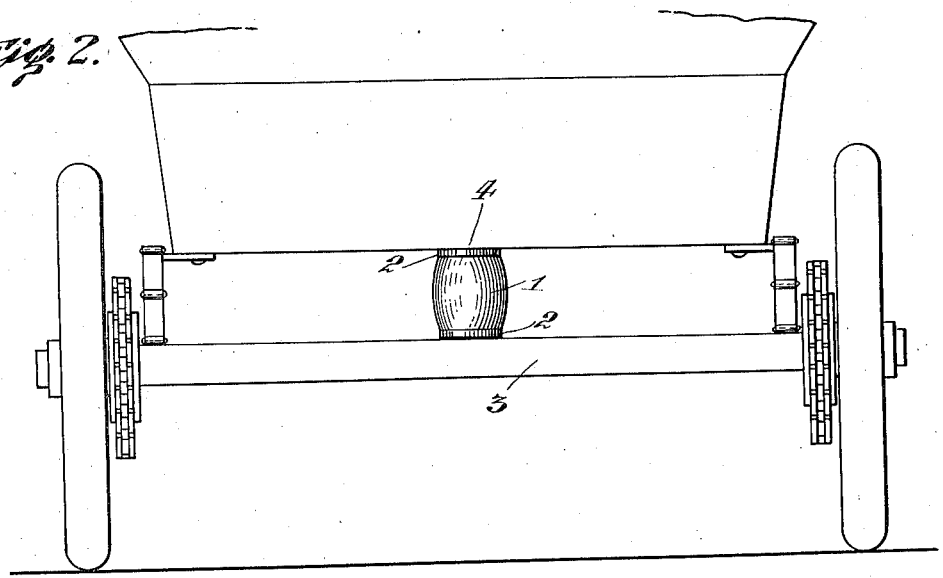
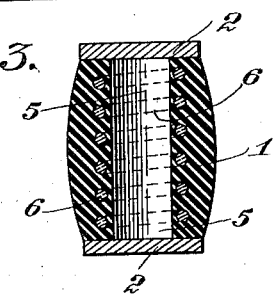

UNITED STATES PATENT OFFICE.

RICHARD T. WAINWRIGHT, OF RYE, NEW YORK.

SHOCK-ABSORBER.

1,032,454.  Specification of Letters Patent.  Patented July 16, 1912.

Application filed August 21, 1911. Serial No. 645,196.

*To all whom it may concern:*

Be it known that I, RICHARD T. WAINWRIGHT, a citizen of the United States, residing in the town of Rye, county of Westchester, and State of New York, have invented certain new and useful Improvements in Shock-Absorbers, of which the following is a clear and complete disclosure.

My invention relates to shock absorbers of the kind commonly employed in automobiles and similar vehicles, to supplement and improve the action of the springs supporting the body, by preventing excessive vibration.

The object of my invention is to provide a device of this kind which will be strong and durable and cheap to manufacture.

In the drawing accompanying and forming a part of this specification, I have illustrated one embodiment of my invention and the way in which it is to be applied.

In this drawing, Figure 1 is a side elevation of my improved device; Fig. 2 shows one way of applying the device to a vehicle; and Fig. 3 is a transverse sectional view of the shock absorber shown in Figs. 1 and 2.

Referring in detail to the construction shown in these views, the numeral 1 designates a body of resilient rubber, which is firmly secured, preferably by vulcanization at each end, to metallic plates 2. These plates, one of which may be designated the axle attachment and the other the body attachment, are, in the practice of my invention, secured one to the axle or running gear of the vehicle and the other to the body. The rubber member 1 contains a longitudinally disposed opening 5, which is surrounded by a cylindrical spring 6 disposed around the opening and embedded in the body of the rubber.

In Fig. 2 a single shock absorber of the kind above described is shown in position on a vehicle. It is located at the middle of the axle 3, to which it is secured at its lower end, and is fixed to the middle of the body 4 at its upper end. By reason of the simple and strong construction which my arrangement permits, a single shock absorber will be found sufficient in many instances.

I have found that when a cylindrical spring is combined with a rubber member and an opening in the manner shown in these drawings, the absorber, while possessing a certain amount of resiliency, has a valuable damping effect on the action of the springs.

I am aware that rubber bumpers have heretofore been used to supplement springs, but I am not aware that it has ever been proposed to construct a shock absorber by embedding a spring in a body of rubber and by providing attaching devices at each end so that the device may act both as a tension and compression device.

What I claim is:

A device of the kind described, comprising an axle attachment, a body attachment, a resilient rubber member having a longitudinally disposed opening therein surrounded by a cylindrical spring embedded in the body of the rubber, said rubber member being shaped to resist both tension and compression and having its two ends firmly secured to said attachments, substantially as described.

RICHARD T. WAINWRIGHT.

Witnesses:
 WALTER S. JONES,
 JOHN W. PETERS.